United States Patent
Park et al.

(10) Patent No.: US 10,674,113 B2
(45) Date of Patent: Jun. 2, 2020

(54) IMAGE PROCESSOR, DISPLAY DEVICE INCLUDING THE IMAGE PROCESSOR, AND METHOD OF DRIVING THE DISPLAY DEVICE

(71) Applicant: Samsung Display Co., Ltd., Yongin-si, Gyeonggi-do (KR)

(72) Inventors: Ji-Eun Park, Hwaseong-si (KR); Jinwoo Noh, Hwaseong-si (KR); Youngwook Yoo, Suwon-si (KR); Heechul Hwang, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 50 days.

(21) Appl. No.: 16/155,568

(22) Filed: Oct. 9, 2018

(65) Prior Publication Data

US 2019/0116336 A1     Apr. 18, 2019

(30) Foreign Application Priority Data

Oct. 18, 2017   (KR) ........................ 10-2017-0135452

(51) Int. Cl.
*G09G 3/30* (2006.01)
*G09G 3/36* (2006.01)
*H04N 7/01* (2006.01)
*G09G 3/20* (2006.01)
(Continued)

(52) U.S. Cl.
CPC ......... *H04N 7/0147* (2013.01); *G06T 3/4007* (2013.01); *G06T 3/4023* (2013.01); *G09G 3/2003* (2013.01); *G09G 3/3208* (2013.01); *G09G 2300/0452* (2013.01); *G09G 2340/0457* (2013.01); *H04N 7/0117* (2013.01); *H04N 7/0125* (2013.01)

(58) Field of Classification Search
CPC ......... G09G 2340/04–0435; G09G 2340/0457
See application file for complete search history.

(56) References Cited

U.S. PATENT DOCUMENTS

| | | | |
|---|---|---|---|
| 2009/0315917 A1* | 12/2009 | Uehori | G06T 3/4092 345/668 |
| 2011/0043526 A1* | 2/2011 | Shiomi | G06T 3/40 345/428 |
| 2011/0084982 A1* | 4/2011 | Mihalov | G09G 5/373 345/629 |

FOREIGN PATENT DOCUMENTS

| | | |
|---|---|---|
| KR | 10-2004-0100735 A | 12/2004 |
| KR | 10-2017-0000869 A | 1/2017 |

* cited by examiner

*Primary Examiner* — Sanghyuk Park
(74) *Attorney, Agent, or Firm* — Lewis Roca Rothgerber Christie LLP

(57) ABSTRACT

A display device includes a display panel including a first pixel having first and second sub-pixels for first and second color light, and a second pixel having third and fourth sub-pixels for third and second color light, an image processor to convert input image data into output image data of greater resolution, and a panel driver to display images based on the output image data, the input image data including first, second, and third input color data corresponding to the first, second, and third color light, the output image data including first, second, and third output color data corresponding to the first, second, and third color light, and the image processor for generating the first and third output color data, by performing an upscaling-rendering operation on the first and third input color data, and the second output color data, by performing an upscaling operation on the second input color data.

20 Claims, 12 Drawing Sheets

(51) Int. Cl.
*G06T 3/40* (2006.01)
*G09G 3/3208* (2016.01)

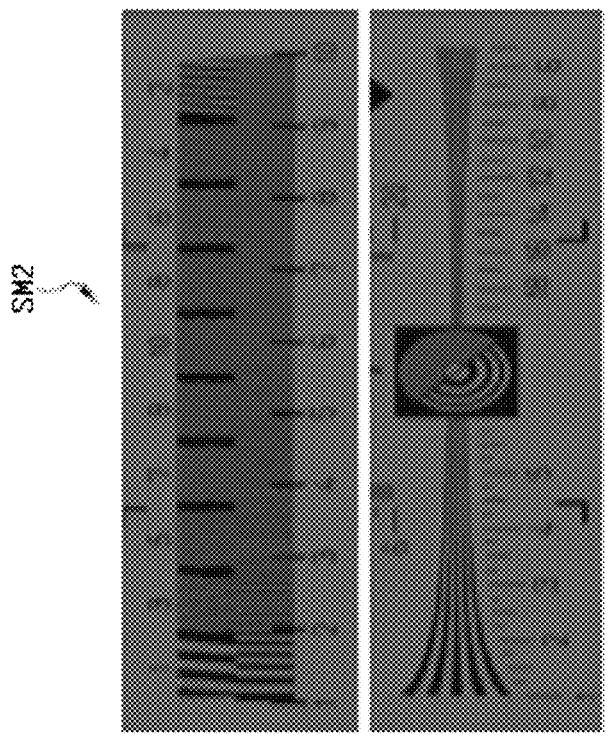
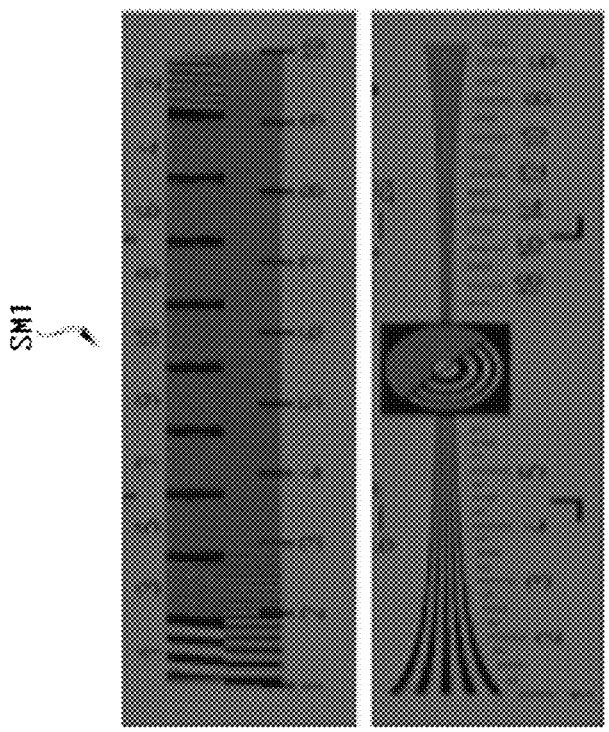
FIG. 10

IMAGE PROCESSOR, DISPLAY DEVICE INCLUDING THE IMAGE PROCESSOR, AND METHOD OF DRIVING THE DISPLAY DEVICE

CROSS-REFERENCE TO RELATED APPLICATION

This application claims priority to, and the benefit of, Korean Patent Application No. 10-2017-0135452, filed on Oct. 18, 2017 in the Korean Intellectual Property Office (KIPO), the contents of which are incorporated herein in its entirety by reference.

BACKGROUND

1. Field

Embodiments of the present inventive concept relate to display devices, and to image processors, display devices including the image processors, and methods of driving the display devices.

2. Description of the Related Art

As a resolution of a display device increases, the resolution of the display device may be higher than a resolution of input image data. Thus, a high-resolution display device may employ an image processor that performs an upscaling operation for converting low-resolution image data into high-resolution image data. For example, an ultra high definition (UHD) (e.g., 3840*2160 resolution) display device may display an image based on full high definition (FHD) (e.g., 1920*1080 resolution) image data by performing the upscaling operation.

However, although various upscaling algorithms for the upscaling operation have been developed, a large-sized memory and a complicated operation may generally be used to improve upscaling performance of the upscaling algorithms.

SUMMARY

Some embodiments provide a display device capable of reducing an image processing load and capable of improving image quality. Some embodiments provide a method of driving the display device. Some embodiments provide an image processor included in the display device.

According to embodiments described herein, there is provided a display device including a display panel, which includes a first pixel having a first sub-pixel for emitting first color light and a second sub-pixel for emitting second color light, and a second pixel having a third sub-pixel for emitting third color light and a fourth sub-pixel for emitting the second color light, an image processor configured to convert input image data having a first resolution into output image data having a second resolution that is greater than the first resolution, and a panel driver configured to drive the display panel to display an image based on the output image data, wherein the input image data include first input color data, second input color data, and third input color data respectively corresponding to the first color light, the second color light, and the third color light, wherein the output image data include first output color data, second output color data, and third output color data respectively corresponding to the first color light, the second color light, and the third color light, and wherein the image processor is configured to generate the first output color data and the third output color data by performing an upscaling-rendering operation on the first input color data and the third input color data, and is configured to generate the second output color data by performing an upscaling operation on the second input color data.

The first output color data may include first original color data and first additional color data, and the upscaling-rendering operation may include outputting the first input color data as the first original color data, and generating the first additional color data by applying a first rendering filter to the first original color data.

The first rendering filter may generate the first additional color data for the first sub-pixel by averaging the first original color data for sub-pixels adjacent to the first sub-pixel.

The second output color data may include second original color data that is the same as the second input color data, and second additional color data that are generated by applying an upscaling algorithm to the second input color data.

The upscaling algorithm may include at least one of an edge-directed interpolation method, a vector extraction method, and a machine-learning method.

The third output color data may include third original color data and third additional color data, and the upscaling-rendering operation may include outputting the third input color data as the third original color data, and generating the third additional color data by applying a second rendering filter to the third original color data.

The first rendering filter and the second rendering filter may be the same.

The image processor may include an input interface configured to receive the input image data, and an upscaling-rendering engine configured to generate the output image data based on the input image data by performing the upscaling-rendering operation on the first input color data and the third input color data, and by performing the upscaling operation on the second input color data.

The image processor may include an input interface configured to receive the input image data, an image engine configured to generate corrected image data by performing the upscaling operation on the second input color data, and an upscaling-rendering engine configured to generate the output image data based on the corrected image data by performing the upscaling-rendering operation on the first input color data and the third input color data.

According to embodiments described herein, there is provided a method of driving a display device including a first pixel, which has a first sub-pixel for emitting first color light and a second sub-pixel for emitting second color light, and a second pixel, which has a third sub-pixel for emitting third color light and a fourth sub-pixel for emitting the second color light, the method including receiving input image data including first input color data, second input color data, and third input color data respectively corresponding to the first color light, the second color light, and the third color light, generating first and third output color data by performing an upscaling-rendering operation on the first and third input color data, and second output color data by performing an upscaling operation on the second input color data, and outputting output image data including the first output color data, the second output color data, and the third output color data respectively corresponding to the first color light, the second color light, and the third color light.

The first output color data may include first original color data and first additional color data, and the upscaling-rendering operation may include outputting the first input color data as the first original color data, and generating the first additional color data by applying a first rendering filter to the first original color data.

Applying the first rendering filter may include generating the first additional color data for the first sub-pixel by averaging the first original color data for sub-pixels adjacent to the first sub-pixel.

The second output color data may include second original color data that is the same as the second input color data, and second additional color data that are generated by applying an upscaling algorithm to the second input color data.

The upscaling algorithm may include at least one of an edge-directed interpolation method, a vector extraction method, and a machine-learning method.

The third output color data may include third original color data and third additional color data, and the upscaling-rendering operation may include outputting the third input color data as the third original color data, and generating the third additional color data by applying a second rendering filter to the third original color data.

The first rendering filter and the second rendering filter may be the same.

According to embodiments described herein, there is provided an image processor included in a display device including a first pixel, which has a first sub-pixel for emitting first color light and a second sub-pixel for emitting second color light, and a second pixel, which has a third sub-pixel for emitting third color light and a fourth sub-pixel for emitting the second color light, the image processor including an input interface configured to receive input image data including first input color data, second input color data, and third input color data respectively corresponding to the first color light, the second color light, and the third color light, and an upscaling-rendering engine configured to generate output image data based on the input image data by performing an upscaling-rendering operation on the first input color data and the third input color data, and by performing an upscaling operation on the second input color data.

The output image data may include first output color data, second output color data, and third output color data respectively corresponding to the first color light, the second color light, and the third color light, the first output color data may include first original color data and first additional color data, and the upscaling-rendering operation may include outputting the first input color data as the first original color data, and generating the first additional color data by applying a first rendering filter to the first original color data.

The first rendering filter may generate the first additional color data for the first sub-pixel by averaging the first original color data for sub-pixels adjacent to the first sub-pixel.

The second output color data may include second original color data that is the same as the second input color data, and second additional color data that are generated by applying an upscaling algorithm to the second input color data.

As described above, the display device according to embodiments may have a pentile pixel arrangement structure, may perform an upscaling-rendering operation on first and third color data, and may perform an upscaling operation on second color data. Accordingly, in the display device according to embodiments, when compared with a display device that performs a sub-pixel rendering operation after performing an upscaling operation on the entirety of the input image data, a processing amount may be reduced, and image quality may be improved.

The method of driving the display device according to embodiments may perform the upscaling operation or the upscaling-rendering operation according to types (or colors) of sub-pixels based on a pixel arrangement structure, thereby displaying a more clear image. Also, the image processor according to embodiments may efficiently process image data provided to the display device having the pentile pixel arrangement structure.

BRIEF DESCRIPTION OF THE DRAWINGS

Illustrative, non-limiting embodiments will be more clearly understood from the following detailed description in conjunction with the accompanying drawings.

FIG. 10 is a diagram for describing an effect of image quality improvement by a display device illustrated in FIG. 1.

DETAILED DESCRIPTION

Figure 1:
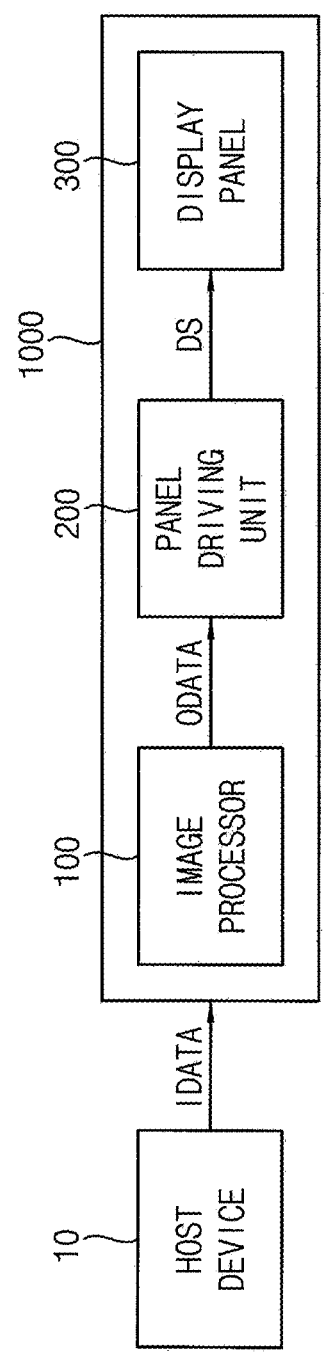
FIG. 1 is a block diagram illustrating a host device and a display device according to an embodiment.

Features of the inventive concept and methods of accomplishing the same may be understood more readily by reference to the following detailed description of embodiments and the accompanying drawings. Hereinafter, embodiments will be described in more detail with reference to the accompanying drawings. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

When a certain embodiment may be implemented differently, a specific process order may be performed differently from the described order. For example, two consecutively described processes may be performed substantially at the same time or performed in an order opposite to the described order.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the described embodiments.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram illustrating a host device and a display device according to an embodiment.

Referring to FIG. 1, a display device 1000 includes an image processor 100, a panel driver 200, and a display panel 300. The display device 1000 may receive input image data IDATA from a host device 10, and may display an image based on the input image data IDATA. In some embodiments, the display device 1000 may be an organic light emitting diode (OLED) display device. The host device 10 may be a graphic controller, an application processor, or any device that provides the input image data IDATA to the display device 1000.

The image processor 100 may convert the input image data IDATA into output image data ODATA corresponding to a resolution of, and a pixel arrangement structure of, the display panel 300. In some embodiments, the image processor 100 may convert the input image data IDATA having a first resolution into the output image data ODATA having a second resolution that is greater than the first resolution. Thus, the image processor 100 may perform an upscaling operation that converts the low resolution image data IDATA into the high resolution image data ODATA. The input image data IDATA may include first input color data, second input color data, and third input color data respectively corresponding to first color light, second color light, and third color light.

The output image data ODATA may include first output color data, second output color data, and third output color data respectively corresponding to the first color light, the second color light, and the third color light. For example, each of the input image data IDATA and the output image data ODATA may include red data, green data, and blue data. The image processor 100 may selectively perform an upscaling-rendering operation or an upscaling operation according to types (or colors) of sub-pixels by considering the pixel arrangement structure of the display panel 300, thereby improving image processing efficiency.

Here, the upscaling-rendering operation may be an operation in which the upscaling operation, which converts low definition image data into high definition image data, and a down-sampling operation/sub-pixel rendering operation, which converts RGB image data into image data corresponding to a pentile pixel arrangement structure (e.g., RGBG image data), are merged. The upscaling-rendering operation may output the input image data IDATA as original color data, and may generate additional color data by applying a rendering filter to the original color data (or the input image data IDATA) without performing a separate upscaling operation. The upscaling-rendering operation may generate first additional color data by applying a first rendering filter to first original color data (or the first input color data), and may generate third additional color data by applying a second rendering filter to third original color data (or the third input color data). For example, the red data and the blue data of the input image data IDATA may be processed by the upscaling-rendering operation using the first and second rendering filters to correspond to red sub-pixels and blue sub-pixels, respectively.

The upscaling operation may increase a resolution of the image data. The upscaling operation may generate second additional color data by applying an upscaling algorithm to the second input color data. For example, the output image data ODATA for green sub-pixels included in the display panel 300 may be generated by performing the upscaling operation on the green data of the input image data IDATA. In some embodiments, the upscaling algorithm may include at least one of an edge-directed interpolation method, a vector extraction method, and a machine-learning method.

The panel driver 200 may provide a driving signal DS to the display panel 300 to display an image based on the output image data ODATA. In some embodiments, the panel driver 200 may include a scan driver that provides a scan signal, and a data driver that converts the output image data ODATA into analog data signals and then outputs the analog data signals.

The display panel 300 may include a plurality of pixels. In some embodiments, the display panel 300 may have a pentile pixel arrangement structure. In the display panel 300, first pixels each including a first sub-pixel for emitting first color light (e.g., red light) and a second sub-pixel for emitting second color light (e.g., green light), and second pixels each including a third sub-pixel for emitting third color light (e.g., blue light) and a fourth sub-pixel for emitting the second color light (e.g., the green light) may be alternately arranged in a matrix form.

Figure 2:
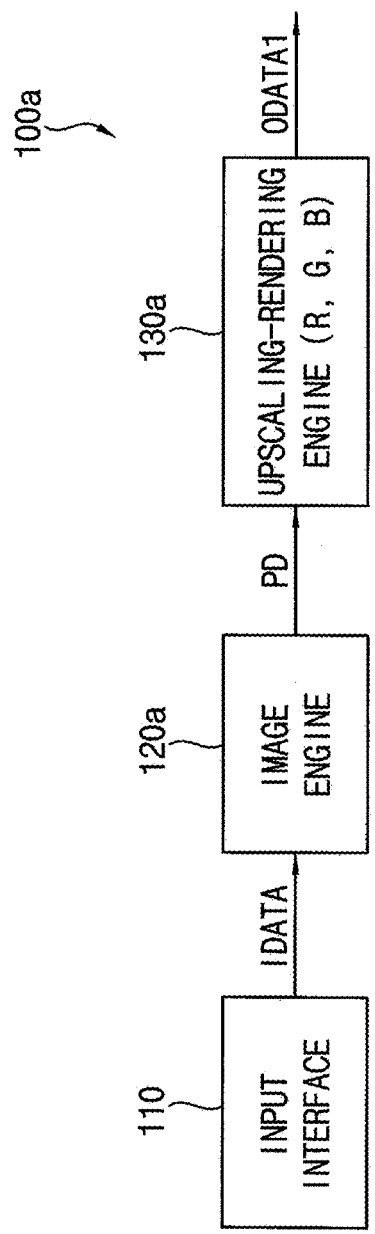
FIG. 2 is an example of an image processor included in a display device illustrated in FIG. 1.

FIG. 2 is an example of an image processor included in a display device illustrated in FIG. 1.

Referring to FIG. 2, an image processor 100*a* may include an input interface 110, an image engine 120*a*, and an upscaling-rendering engine 130*a*.

The input interface 110 may receive input image data IDATA having a first resolution, and may provide the input image data IDATA to the image engine 120*a*. In some embodiments, the first resolution may be less than a second resolution of a display panel. For example, the first resolution may correspond to full high definition (FHD) (or a 1920*1080 resolution), and the second resolution may correspond to ultra high definition (UHD) (or a 3840*2160 resolution). The input image data IDATA may include first input color data (e.g., input red data), second input color data (e.g., input green data), and third input color data (e.g., input blue data), which respectively correspond to first color light (e.g., red light), second color light (e.g., green light), and third color light (e.g., blue light). The input interface 110 may be a display interface of a mobile device, such as a mobile industry processor interface (MIPI), a display serial interface (DSI), etc.

The image engine 120*a* may process digital image data (e.g., the input image data IDATA) to improve image quality, such as sharpness, noise reduction, light and darkness contrast, color contrast, etc. For example, the image engine 120*a* may be a digital natural image engine (DNIe) that adjusts sharpness, noise reduction, light and darkness contrast, color contrast, etc. Thus, the image engine 120*a* may generate image processed data PD by processing the input image data IDATA.

The upscaling-rendering engine 130*a* may generate output image data ODATA1 by performing an upscaling-rendering operation on the first and third input color data, and by performing an upscaling operation on the second input color data, based on the input image data IDATA (or based on the image processed data PD). The output image data ODATA1 may include first output color data (e.g., output red data), second output color data (e.g., output green data), and third output color data (e.g., output blue data) respectively corresponding to the first color light, the second color light, and the third color light.

In some embodiments, the first output color data may include first original color data that is the same as the first input color data, and first additional color data that is generated based on the first original color data (or the first input color data), and the third output color data may include third original color data that is the same as the third input color data and third additional color data that is generated based on the third original color data (or the third input color data). The upscaling-rendering operation may generate the first and third additional color data by respectively applying first and second rendering filters to the first and third original color data (or to the first and third input color data). The first rendering filter may generate the first additional color data for a first sub-pixel based on the first input color data for sub-pixels that are adjacent to the first sub-pixel. The second rendering filter may generate the third additional color data for a third sub-pixel based on the third input color data for sub-pixels that are adjacent to the third sub-pixel.

In some embodiments, the second output color data may include second original color data that is the same as the second input color data, and second additional color data that is generated by applying an upscaling algorithm to the second input color data.

The upscaling-rendering operation and the upscaling operation will be described below with reference to FIGS. 3A, 3B, 4, and 5.

Although FIG. 2 illustrates an example where the image processor 100a includes the input interface 110, the image engine 120a and the upscaling-rendering engine 130a, a configuration of the image processor 100a may not necessarily be limited thereto. For example, the image processor 100a may omit the image engine 120a, or may further include an output interface for communicating with a panel driver.

Figure 3A:
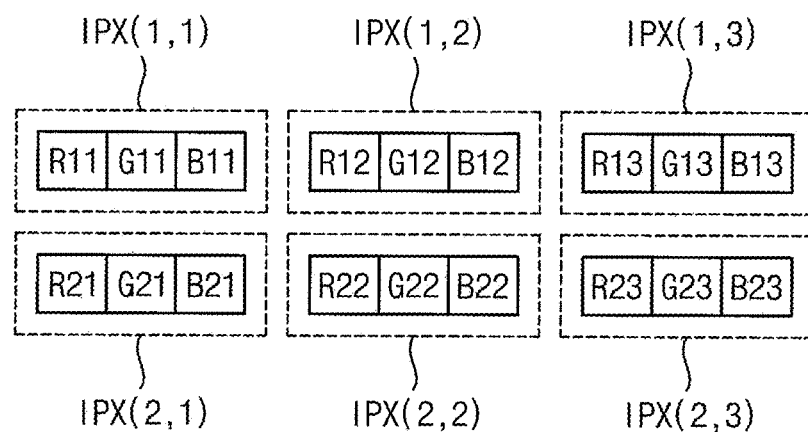
FIGS. 3A and 3B are diagrams for describing an example where an image processor included in a display device of FIG. 1 generates output image data by performing an upscaling-rendering operation and an upscaling operation.
Figure 3B:
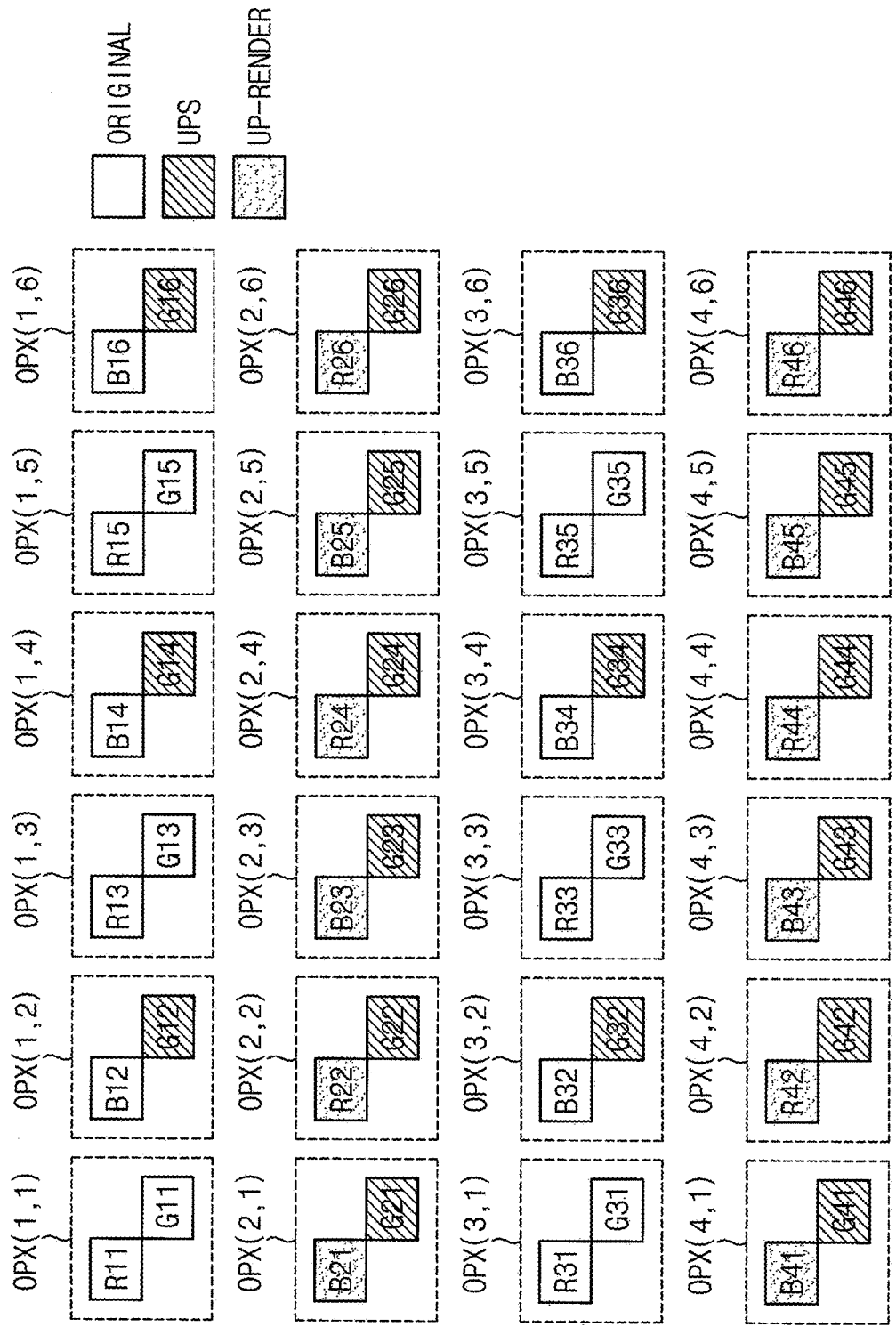
Figure 4:
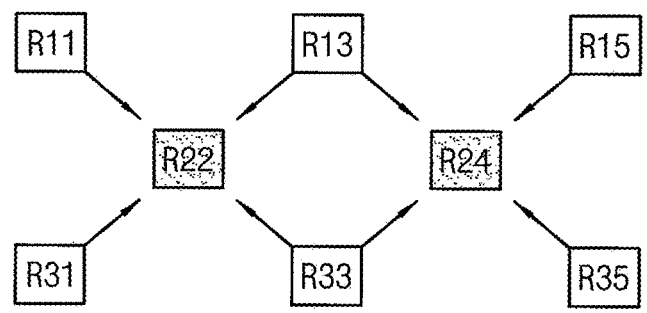
FIGS. 4 and 5 are diagrams for describing an example where first and third output color data are generated by an upscaling-rendering operation.
Figure 5:
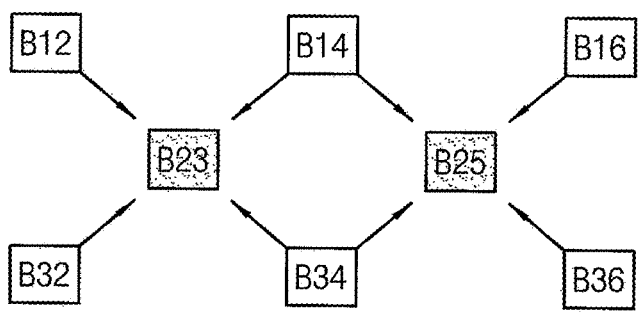

FIGS. 3A and 3B are diagrams for describing an example where an image processor included in a display device of the embodiment of FIG. 1 generates output image data by performing an upscaling-rendering operation and an upscaling operation, and FIGS. 4 and 5 are diagrams for describing an example where first and third output color data are generated by an upscaling-rendering operation.

As illustrated in FIG. 3A, an image processor may receive, as input image data, RGB-type image data having a first resolution. For example, the input image data may include input red data, input green data, and input blue data respectively for a red sub-pixel (e.g., R11), a green sub-pixel (e.g., G11), and a blue sub-pixel (e.g., B11) included in each pixel (e.g., IPX(1,1)). The first resolution may be FHD (e.g., a 1920*1080 resolution). Thus, the input image data may include 1920*1080 input red data, 1920*1080 input green data, and 1920*1080 input blue data.

As illustrated in FIG. 3B, a display panel may have a pentile pixel arrangement structure. For example, the display panel may have a structure where first pixels (e.g., first pixels OPX(1,1), OPX(1,3), OPX(1,5), OPX(2,2), OPX(2,4), OPX(2,6), OPX(3,1), OPX(3,3), OPX(3,5), OPX(4,2), OPX(4,4), and OPX(4,6)), which each include a red sub-pixel (e.g., a respective one of red sub-pixels R11, R13, R15, R22, R24, R26, R31, R33, R35, R42, R44, and R46) and a green sub-pixel (e.g., a respective one of green sub-pixels G11, G13, G15, G22, G24, G26, G31, G33, G35, G42, G44, and G46), and second pixels (e.g., second pixels OPX(1,2), OPX(1,4), OPX(1,6), OPX(2,1), OPX(2,3), OPX(2,5), OPX(3,2), OPX(3,4), OPX(3,6), OPX(4,1), OPX(4,3), and OPX(4,5)), which each include a blue sub-pixel (e.g., a respective one of blue sub-pixels B12, B14, B16, B21, B23, B25, B32, B34, B36, B41, B43, and B45) and a green sub-pixel (e.g., a respective one of green sub-pixels G12, G14, G16, G21, G23, G25, G32, G34, G36, G41, G43, and G45), are alternately arranged in a horizontal direction and a vertical direction. A second resolution of the display panel may be UHD (e.g., a 3840*2160 resolution). Thus, the display panel may include 1920*2160 red sub-pixels, 3840*2160 green sub-pixels and 1920*2160 blue sub-pixels.

The image processor may convert the input image data having the first resolution into output image data having the second resolution, which is suitable for the pixel arrangement structure of the display panel. Thus, the output image data may include 1920*2160 output red data, 3840*2160 output green data and 1920*2160 output blue data.

The image processor may convert the 1920*1080 input red data into the 1920*2160 output red data, and may convert the 1920*1080 input blue data into the 1920*2160 output blue data. Because the input red data and the input blue data are required to be doubled in a vertical direction, the upscaling-rendering operation may output the input red data and the input blue data as they are input, and may generate additional red data and additional blue data that are the same in number as the input red data and the input blue data.

Referring to FIGS. 3A, 3B, and 4, with respect to red sub-pixels, the output red data for red sub-pixels R11, R13, and R15 respectively included in output pixels OPX(1,1), OPX(1,3), and OPX(1,5) may be set as the input red data for sub-pixels R11, R12, and R13 respectively included in input pixels IPX(1,1), IPX(1,2), and IPX(1,3). Here, the output pixels may be the pixels (of the display panel) arranged in the pentile pixel arrangement structure, and the input pixels may be the pixels (corresponding to the input image data) arranged in an RGB pixel arrangement structure. Further, the output red data for red sub-pixels R31, R33, and R35 respectively included in output pixels OPX(3,1), OPX(3,3), and OPX(3,5) may be set as the input red data for sub-pixels R21, R22, and R23 respectively included in input pixels IPX(2,1), IPX(2,2), and IPX(2,3). Thus, the output red data for the red sub-pixels located in odd-numbered rows may be original red data (or original data ORIGINAL) that is the same as the input red data.

However, the output red data for the red sub-pixels located in even-numbered rows may be additional red data that is different from the input red data. The image processor may generate the additional red data (or upscaling-rendering data UP-RENDER) by applying a first rendering filter to the original red data (or the input red data).

For example, in FIG. 4, the output red data for a red sub-pixel R22 included in an output pixel OPX(2,2) may be set as an average value of the original red data set for adjacent red sub-pixels R11, R13, R31, and R33 included in adjacent output pixels OPX(1,1), OPX(1,3), OPX(3,1), and OPX(3,3) (e.g., an average value of the input red data for red sub-pixels R11, R12, R21, and R22 included in input pixels IPX(1,1), IPX(1,2), IPX(2,1), and IPX(2,2)). Further, the output red data for a red sub-pixel R24 included in an output pixel OPX(2,4) may be set as an average value of the original red data set for adjacent red sub-pixels R13, R15, R33, and R35 included in adjacent output pixels OPX(1,3), OPX(1,5), OPX(3,3), and OPX(3,5).

Referring to FIGS. 3A, 3B, and 5, with respect to blue sub-pixels, the output blue data for blue sub-pixels B12, B14, and B16 respectively included in output pixels OPX(1,2), OPX(1,4), and OPX(1,6) may be set as the input blue data for sub-pixels B11, B12, and B13 respectively included in input pixels IPX(1,1), IPX(1,2), and IPX(1,3). Further, the output blue data for blue sub-pixels B32, B34, and B36 respectively included in output pixels OPX(3,2), OPX(3,4), and OPX(3,6) may be set as the input blue data for sub-pixels B21, B22, and B23 respectively included in input pixels IPX(2,1), IPX(2,2), and IPX(2,3). Thus, the output blue data for the blue sub-pixels located in odd-numbered rows may be original blue data (or original data ORIGINAL) that is the same as the input blue data.

However, the output blue data for the blue sub-pixels located in even-numbered rows may be additional blue data that is different from the input blue data. The image processor may generate the additional blue data (or upscaling-rendering data UP-RENDER) by applying a second rendering filter to the original blue data (or the input blue data). For example, in FIG. 5, the output blue data for a blue sub-pixel B23 included in an output pixel OPX(2,3) may be set as an average value of the original blue data set for adjacent blue sub-pixels B12, B14, B32, and B34 included in adjacent output pixels OPX(1,2), OPX(1,4), OPX(3,2), and OPX(3,4) (e.g., an average value of the input blue data for blue sub-pixels B11, B12, B21, and B22 included in input pixels IPX(1,1), IPX(1,2), IPX(2,1), and IPX(2,2)). Further, the output blue data for a blue sub-pixel B25 included in an output pixel OPX(2,5) may be set as an average value of the original blue data set for adjacent blue sub-pixels B14, B16, B34, and B36 included in adjacent output pixels OPX(1,4), OPX(1,6), OPX(3,4), and OPX(3,6). The output blue data for a blue sub-pixel B21 included in an output pixel OPX (2,1) located at an edge portion of the display panel may be set as an average value of the original blue data set for two adjacent blue sub-pixels B12 and B32 included in two adjacent output pixels OPX(1,2) and OPX(3,2).

The image processor may convert the 1920*1080 input green data into the 3840*2160 output green data. Because the input green data are required to be doubled not only in a vertical direction, but also in a horizontal direction, the upscaling operation may output the input green data as they are input, and may generate additional green data in an amount that is three times as many as the input green data.

Referring to FIGS. 3A and 3B, with respect to green sub-pixels, the output green data for green sub-pixels G11, G13, and G15 respectively included in output pixels OPX (1,1), OPX(1,3), and OPX(1,5) may be set as the input green data for sub-pixels G11, G12, and G13 respectively included in input pixels IPX(1,1), IPX(1,2), and IPX(1,3). Further, the output green data for green sub-pixels G31, G33, and G35 respectively included in output pixels OPX(3,1), OPX(3,3), and OPX(3,5) may be set as the input blue data for sub-pixels G21, G22, and G23 respectively included in input pixels IPX(2,1), IPX(2,2), and IPX(2,3). Thus, the output green data for the green sub-pixels located both in an odd-numbered row and in an odd-numbered column may be original green data (or original data ORIGINAL) the same as the input green data.

However, the output green data for green sub-pixels G12, G14, G16, G21, G22, G23, G24, G25, G26, G32, G34, G36, G41, G42, G43, G44, G45, G46 located in either of an even-numbered row or an even-numbered column may be the additional green data, which is different from the input green data. The image processor may generate the additional green data (or upscaling data UPS) by applying an upscaling algorithm to the input green data. The upscaling algorithm may include at least one of an edge-directed interpolation method, a vector extraction method, and a machine-learning method. The edge-directed interpolation method may be performed such that an edge of an image is maintained after the upscaling operation. The vector extraction method may convert an image into a vector expression regardless of a resolution, and may then convert the vector expression into an image having a desired resolution. The machine-learning method may perform a scaling operation using machine learning, such as a deep neural network method.

Although FIGS. 4 and 5 illustrate examples where the first and second rendering filters are applied corresponding to data of four adjacent sub-pixels, the first and second rendering filters are not limited thereto. For example, in other embodiments, the first and second rendering filters may be applied to data for sub-pixels located in a previous row to reduce a size of a line memory. Further, in some embodiments, the first rendering filter and the second rendering filter may be different filters.

Figure 6:
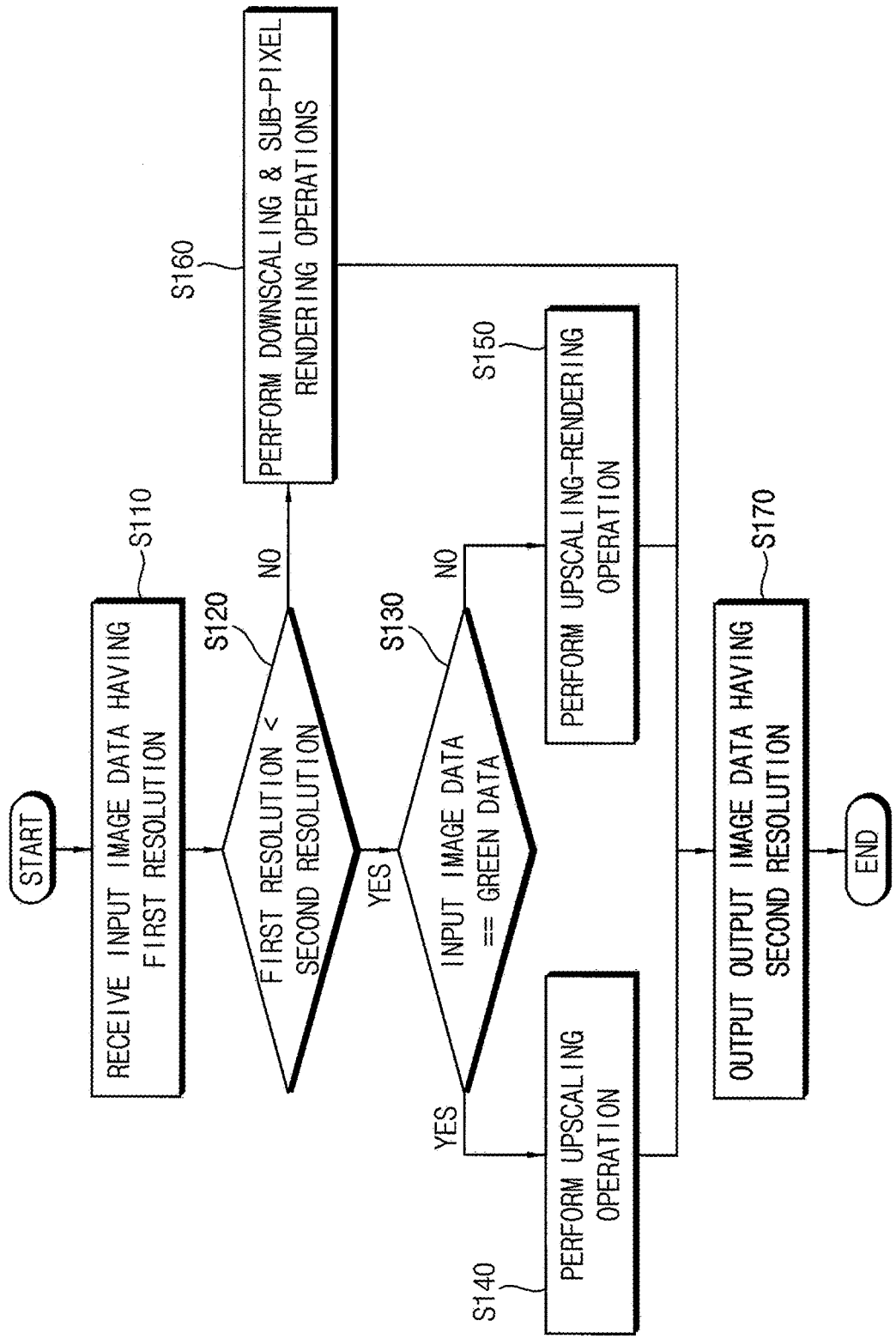
FIG. 6 is a flowchart illustrating a method of driving a display device according to an embodiment.

FIG. 6 is a flowchart illustrating a method of driving a display device according to an embodiment.

Referring to FIG. 6, a method of the embodiment of FIG. 6 may drive a display device (of a pentile pixel arrangement structure) including a first pixel, which has a red sub-pixel for emitting red light and a green sub-pixel for emitting green light, and a second pixel, which has a blue sub-pixel for emitting blue light and a green sub-pixel for emitting the green light, to display a clear image.

In the described method, input image data having a first resolution and including input red data, input green data, and input blue data, which respectively correspond to the red light, the green light, and the blue light, may be received (S110).

The first resolution may be compared with a second resolution, which corresponds to the resolution of the display device (S120).

If the first resolution is less than the second resolution (S120: YES), output green data may be generated by performing an upscaling operation on the input green data among the input image data (S130: YES and S140), and output red data and output blue data may be generated by performing an upscaling-rendering operation on the input red data and the input blue data among the input image data (S130: NO and S150). Because the upscaling-rendering operation and the upscaling operation are described above, duplicated descriptions thereof are omitted.

Alternatively, if the first resolution is greater than or equal to the second resolution (S120: NO), output image data may be generated by performing a sub-pixel rendering operation corresponding to the pentile pixel arrangement structure and/or a downscaling operation to decrease the resolution of the input image (S160).

The output image data including the output red data, the output green data, and the output blue data may be output to display an image corresponding to the output image data (S170).

Figure 7:
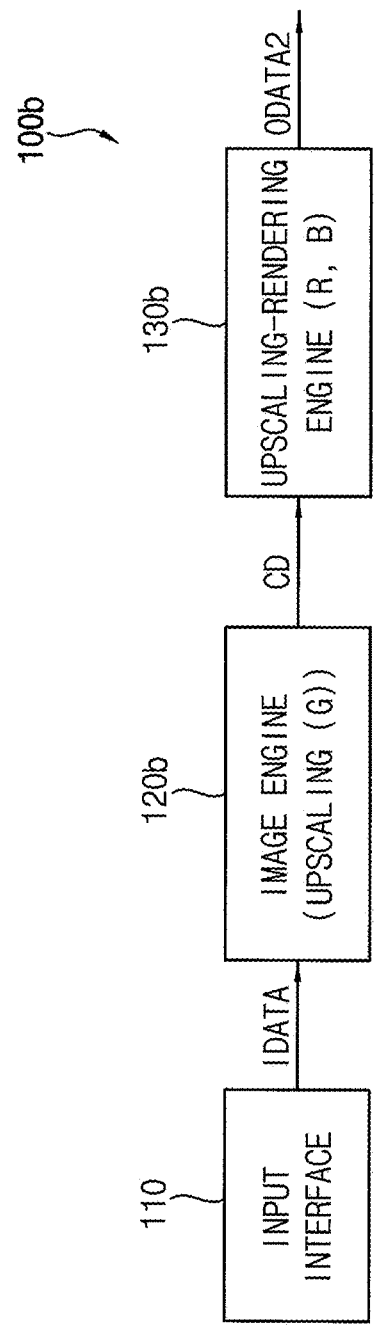
FIG. 7 is a block diagram illustrating another example of an image processor included in a display device of FIG. 1.

FIG. 7 is a block diagram illustrating another example of an image processor included in a display device illustrated in FIG. 1.

Referring to FIG. 7, an image processor 100b may include an input interface 110, an image engine 120b, and an upscaling-rendering engine 130b. The image processor 100b of FIG. 7 may have similar configurations and operations to an image processor 100a of the embodiment of FIG. 2, except that an upscaling operation is performed by the image engine 120b. The same reference numerals may denote the same or similar components, and duplicated descriptions may be omitted.

The input interface 110 may receive input image data IDATA having a first resolution, and may provide the input image data IDATA to the image engine 120b.

The image engine 120b may process digital image data (e.g., the input image data IDATA) to improve image quality, such as sharpness, noise reduction, light and darkness contrast, color contrast, etc. Further, the image engine 120b may generate corrected image data CD by performing the upscaling operation on second input color data (e.g., input green data).

The upscaling-rendering engine 130b may generate output image data ODATA2 by performing an upscaling-rendering operation on first input color data (e.g., input green data) and third input color data (e.g., input blue data) based on the corrected image data CD.

Figure 8:
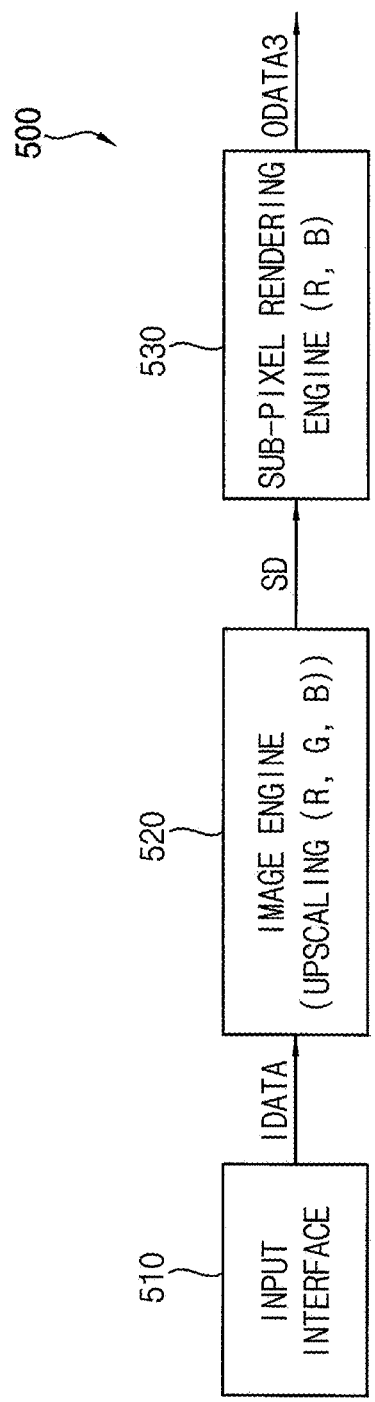
FIG. 8 is a block diagram illustrating an example of an image processor according to a comparative embodiment.
Figure 9A:
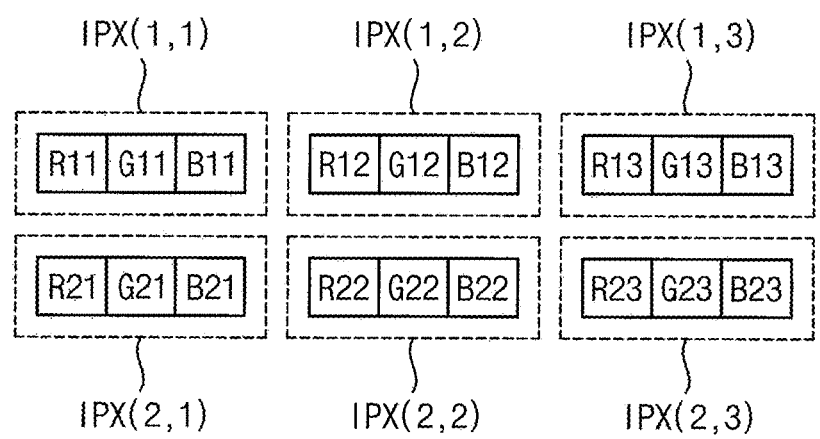
FIGS. 9A through 9C are diagrams for describing an example where an image processor of FIG. 8 sequentially performs an upscaling operation and a sub-pixel rendering operation to generate output image data.
Figure 9B:
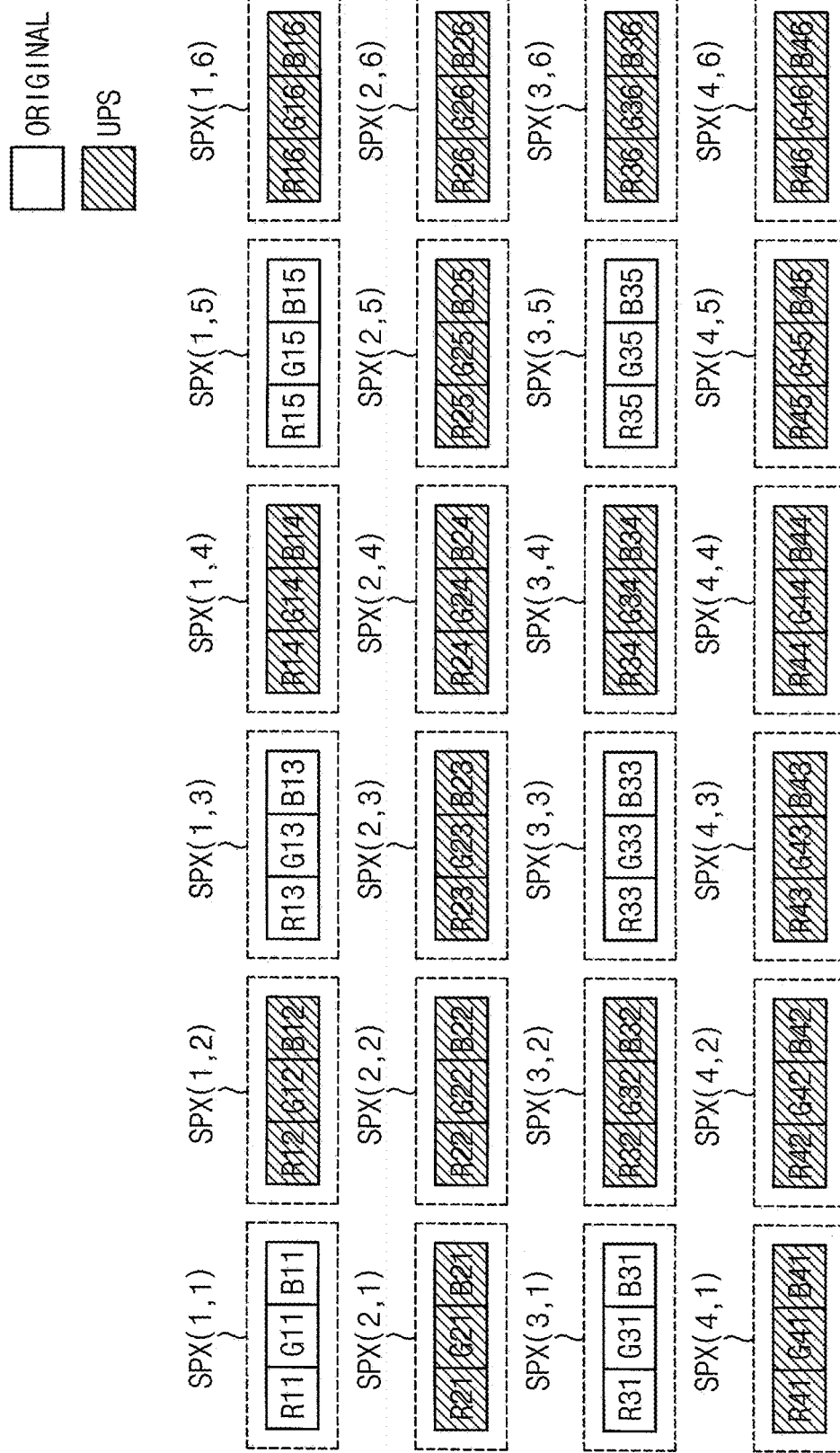
Figure 9C:
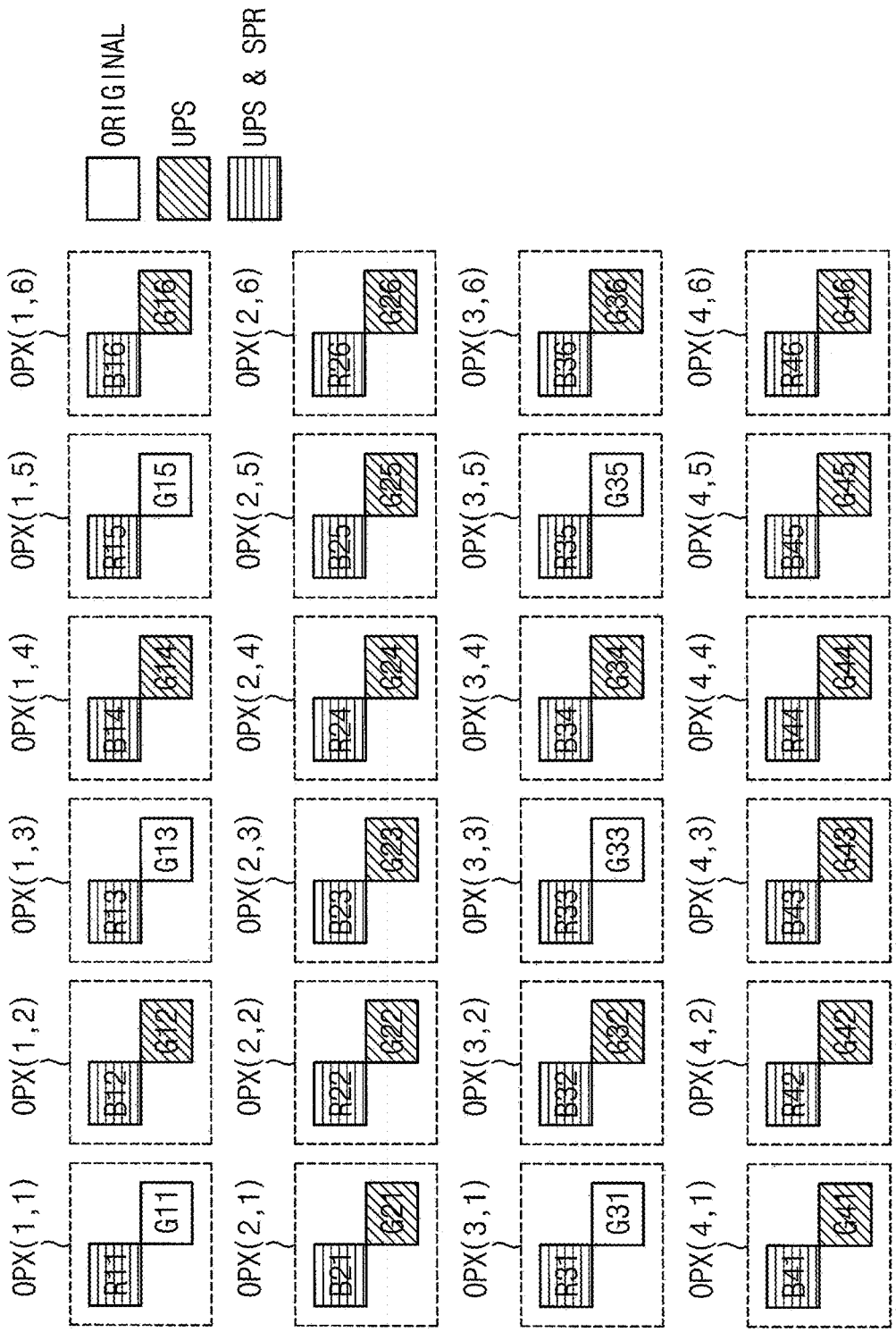

FIG. 8 is a block diagram illustrating an example of an image processor according to a comparative embodiment, FIGS. 9A through 9C are diagrams for describing an example where an image processor of FIG. 8 sequentially performs an upscaling operation and a sub-pixel rendering operation to generate output image data, and FIG. 10 is a diagram for describing an effect of image quality improvement by a display device of the embodiment illustrated in FIG. 1.

Referring to FIGS. 8, 9A, 9B, 9C, and 10, a comparative image processor 500 may include an input interface 510, an image engine 520, and a sub-pixel rendering engine 530.

The input interface 510 may receive RGB-type input image data IDATA having a first resolution. As illustrated in FIG. 9A, the input image data IDATA may include input red data, input green data, and input blue data respectively for a red sub-pixel (e.g., R11), a green sub-pixel (e.g., G11), and a blue sub-pixel (e.g., B11) included in each pixel (e.g., IPX(1,1)). The first resolution may be FHD (e.g., a 1920*1080 resolution). In this case, the input image data IDATA may include 1920*1080 input red data, 1920*1080 input green data, and 1920*1080 input blue data.

The image engine 520 may convert the input image data IDATA having the first resolution into scaled image data SD having a second resolution by performing an upscaling operation on the input image data IDATA. As illustrated in FIG. 9B, the image engine 520 may generate the scaled image data SD by generating upscaling data UPS by applying an upscaling algorithm to the input image data IDATA (e.g., original data ORIGINAL). The upscaling algorithm may include an edge-directed interpolation method, a vector extraction method, or a machine-learning method. The second resolution may be UHD (e.g., a 3840*2160 resolution). In this case, the scaled image data SD may include 3840*2160 red data, 3840*2160 green data, and 3840*2160 blue data.

The sub-pixel rendering engine 530 may perform a sub-pixel rendering operation that down-samples the scaled image data SD to correspond to a pixel arrangement structure of a display device. Accordingly, the scaled image data SD may be converted into output image data ODATA3 corresponding to the pixel arrangement structure. As illustrated in FIG. 9C, each pixel included in a display device having a pentile pixel arrangement structure may correspond to a first pixel (e.g., OPX(1,1)) including a red sub-pixel (e.g., R11) and a green sub-pixel (e.g., G11), or a second pixel (e.g., OPX(1,2)) including a blue sub-pixel (e.g., B12) and a green sub-pixel (e.g., G12). Thus, the output image data ODATA3 may include 1920*2160 output red data, 3840*2160 output green data, and 1920*2160 output blue data.

Each of the output red data and the output blue data may be set by referring to the scaled image data SD for sub-pixels that are adjacent in a horizontal direction, and thus may correspond to sub-pixel rendering-after-upscaling data UPS & SPR. For example, the output red data for a red sub-pixel R11 included in an output pixel OPX(1,1) may be set as an average value of the scaled image data SD for red sub-pixels R11 and R12 respectively included in scaled pixels SPX(1,1) and SPX(1,2). The output red data for a red sub-pixel R13 included in an output pixel OPX(1,3) may be set as an average value of the scaled image data SD for red sub-pixels R13 and R14 respectively included in scaled pixels SPX(1,3) and SPX(1,4). The output blue data for a blue sub-pixel B12 included in an output pixel OPX(1,2) may be set as an average value of the scaled image data SD for blue sub-pixels B11 and B12 respectively included in scaled pixels SPX(1,1) and SPX(1,2). The output blue data for a blue sub-pixel B14 included in an output pixel OPX(1,4) may be set as an average value of the scaled image data SD for blue sub-pixels B13 and B14 respectively included in scaled pixels SPX(1,3) and SPX(1,4).

The output green data have one-to-one correspondence with the green data of the scaled image data SD, and thus green data of the scaled image data SD, as it is, may be output as the output green data.

The comparative image processor 500 may perform the upscaling operation on the red, green, and blue data of the input image data IDATA, and then may perform the sub-pixel rendering operation. Thus, the red and blue data of the output image data ODATA3 do not include the original data ORIGINAL that is the same as the input image data IDATA. However, the image processor 100a of FIG. 2 (or an image processor 100b of FIG. 7) according to an embodiment may perform an upscaling-rendering operation on the red and blue data, and may perform the upscaling operation on the green data. Thus, at least a portion (e.g., a half) of the red and blue data may be the original data ORIGINAL that is the same as the input image data IDATA. Accordingly, compared with the comparative image processor 500 of FIG. 8, the image processor 100a of the embodiment of FIG. 2 (or the image processor 100b of the embodiment of FIG. 7) may have the reduced number of total operations and the improved image quality.

As illustrated in FIG. 10, as compared to a first image SM1 processed by the comparative image processor 500 of FIG. 8, a second image SM2 processed by the image processor 100a of the embodiment of FIG. 2 may have clear lines and characters, which can be perceived by the naked eye. Because both of image degradation by the upscaling operation and image degradation by the sub-pixel rendering operation occur in the comparative image processor 500 of FIG. 8, the image quality of the first image SM1 may be relatively low. However, the image processor 100a of the embodiment of FIG. 2 may perform one operation (e.g., the upscaling-rendering operation) where the upscaling operation and the sub-pixel rendering operation are merged, and thus may improve efficiency of image processing and may improve the image quality of the second image SM2.

The foregoing is illustrative of embodiments for an image processor, a display device including the image processor and a method of driving the display device and is not to be construed as limiting thereof. Although a few embodiments have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. For example, although an OLED display device is described above, a type of the display device may not be limited to the OLED display device. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims, with functional equivalents thereof to be included.

What is claimed is:

1. A display device comprising:
    a display panel comprising:
        a first pixel having a first sub-pixel for emitting first color light and a second sub-pixel for emitting second color light; and
        a second pixel having a third sub-pixel for emitting third color light and a fourth sub-pixel for emitting the second color light;
    an image processor configured to convert input image data having a first resolution into output image data having a second resolution that is greater than the first resolution; and
    a panel driver configured to drive the display panel to display an image based on the output image data,
    wherein the input image data comprise first input color data, second input color data, and third input color data respectively corresponding to the first color light, the second color light, and the third color light, wherein the output image data comprise first output color data, second output color data, and third output color data respectively corresponding to the first color light, the second color light, and the third color light, and wherein the image processor is configured to generate the first output color data and the third output color data by performing an upscaling-rendering operation on the first input color data and the third input color data, and is configured to generate the second output color data by performing an upscaling operation on the second input color data.

2. The display device of claim 1, wherein the first output color data comprise first original color data and first additional color data, and wherein the upscaling-rendering operation comprises outputting the first input color data as the first original color data, and generating the first additional color data by applying a first rendering filter to the first original color data.

3. The display device of claim 2, wherein the first rendering filter generates the first additional color data for the first sub-pixel by averaging the first original color data for sub-pixels adjacent to the first sub-pixel.

4. The display device of claim 2, wherein the second output color data comprise second original color data that is the same as the second input color data, and second additional color data that are generated by applying an upscaling algorithm to the second input color data.

5. The display device of claim 4, wherein the upscaling algorithm comprises at least one of an edge-directed interpolation method, a vector extraction method, and a machine-learning method.

6. The display device of claim 2, wherein the third output color data comprise third original color data and third additional color data, and wherein the upscaling-rendering operation comprises outputting the third input color data as the third original color data, and generating the third additional color data by applying a second rendering filter to the third original color data.

7. The display device of claim 6, wherein the first rendering filter and the second rendering filter are the same.

8. The display device of claim 1, wherein the image processor comprises:

an input interface configured to receive the input image data; and an upscaling-rendering engine configured to generate the output image data based on the input image data by performing the upscaling-rendering operation on the first input color data and the third input color data, and by performing the upscaling operation on the second input color data.

9. The display device of claim 1, wherein the image processor comprises:

an input interface configured to receive the input image data;

an image engine configured to generate corrected image data by performing the upscaling operation on the second input color data; and an upscaling-rendering engine configured to generate the output image data based on the corrected image data by performing the upscaling-rendering operation on the first input color data and the third input color data.

10. A method of driving a display device comprising a first pixel, which has a first sub-pixel for emitting first color light and a second sub-pixel for emitting second color light, and a second pixel, which has a third sub-pixel for emitting third color light and a fourth sub-pixel for emitting the second color light, the method comprising:

receiving input image data comprising first input color data, second input color data, and third input color data respectively corresponding to the first color light, the second color light, and the third color light;

generating first and third output color data by performing an upscaling-rendering operation on the first and third input color data, and second output color data by performing an upscaling operation on the second input color data; and outputting output image data comprising the first output color data, the second output color data, and the third output color data respectively corresponding to the first color light, the second color light, and the third color light.

11. The method of claim 10, wherein the first output color data comprise first original color data and first additional color data, and wherein the upscaling-rendering operation comprises outputting the first input color data as the first original color data, and generating the first additional color data by applying a first rendering filter to the first original color data.

12. The method of claim 11, wherein applying the first rendering filter comprises generating the first additional color data for the first sub-pixel by averaging the first original color data for sub-pixels adjacent to the first sub-pixel.

13. The method of claim 11, wherein the second output color data comprise second original color data that is the same as the second input color data, and second additional color data that are generated by applying an upscaling algorithm to the second input color data.

14. The method of claim 13, wherein the upscaling algorithm comprises at least one of an edge-directed interpolation method, a vector extraction method, and a machine-learning method.

15. The method of claim 11, wherein the third output color data comprise third original color data and third additional color data, and wherein the upscaling-rendering operation comprises outputting the third input color data as the third original color data, and generating the third additional color data by applying a second rendering filter to the third original color data.

16. The method of claim 15, wherein the first rendering filter and the second rendering filter are the same.

17. An image processor for a display device comprising a first pixel, which has a first sub-pixel for emitting first color light and a second sub-pixel for emitting second color light, and a second pixel, which has a third sub-pixel for emitting third color light and a fourth sub-pixel for emitting the second color light, the image processor comprising:

an input interface configured to receive input image data comprising first input color data, second input color data, and third input color data respectively corresponding to the first color light, the second color light, and the third color light; and an upscaling-rendering engine configured to generate output image data based on the input image data by performing an upscaling-rendering operation on the first input color data and the third input color data, and by performing an upscaling operation on the second input color data.

18. The image processor of claim 17, wherein the output image data comprise first output color data, second output color data, and third output color data respectively corresponding to the first color light, the second color light, and the third color light, wherein the first output color data comprise first original color data and first additional color data, and wherein the upscaling-rendering operation comprises outputting the first input color data as the first original color data, and generating the first additional color data by applying a first rendering filter to the first original color data.

19. The image processor of claim 18, wherein the first rendering filter generates the first additional color data for the first sub-pixel by averaging the first original color data for sub-pixels adjacent to the first sub-pixel.

20. The image processor of claim 18, wherein the second output color data comprise second original color data that is the same as the second input color data, and second additional color data that are generated by applying an upscaling algorithm to the second input color data.

* * * * *